March 19, 1963  R. LUCIEN  3,081,794
SLIDE VALVE SERVO-CONTROL DISTRIBUTOR
Filed March 24, 1959  2 Sheets-Sheet 1
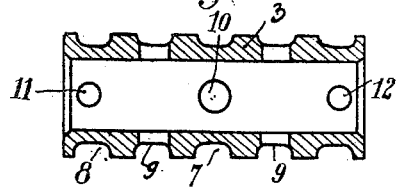
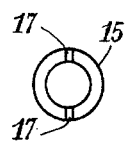
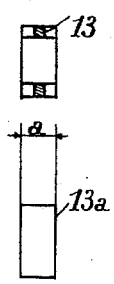
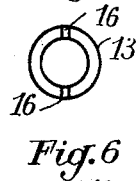
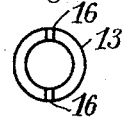
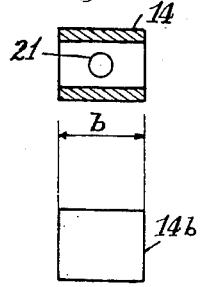
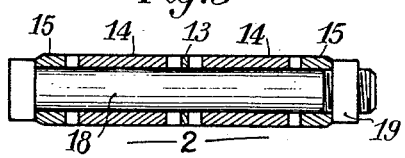
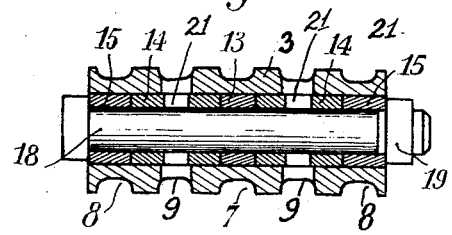
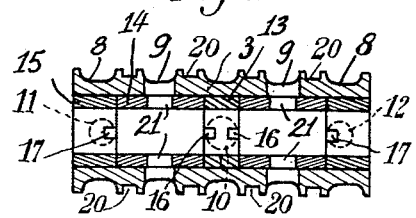

United States Patent Office 3,081,794
Patented Mar. 19, 1963

3,081,794
SLIDE VALVE SERVO-CONTROL DISTRIBUTOR
René Lucien, Neuilly-sur-Seine, France, assignor to Société à responsabilité Limitée: Recherches Études Production R.E.P., Paris, France, a corporation of France
Filed Mar. 24, 1959, Ser. No. 801,567
Claims priority, application France Mar. 24, 1958
3 Claims. (Cl. 137—622)

This invention relates to servo-control distributors.

In hydraulic distributors of the slide-valve type used for servo-control, it is essential that the flow of the liquid should be a strict linear function of the movement of the slide-valve which uncovers the outlets for the passage of the liquid in the jacket in which the slide-valve moves. It is also necessary that the movement of the slide-valve which is necessary to reverse the flow should also be as small as possible. In order to obtain these results, it is necessary to insure that a strict correspondence of position exists between the edges of the slide-valve and the edges of the orifices in the jacket in which the slide-valve moves. It is an object of the invention to provide for such correspondence.

More particularly, the above conditions are fulfilled by the distributor of the present invention constructed according to the method which will be described below.

A special feature of the distributor provided in accordance with the invention is that a jacket provided with inlet and outlet ports in which the slide-valve moves is formed by ground parts placed end to end, the lengths of which are exactly equal to those of the corresponding portions of the slide-valve, that slits having a rectangular cross-section intended to provide openings for the passage of the liquid are formed in the edges of several of these parts, and that these parts are held in close contact by means of a binding member consisting of a sleeve pierced with the necessary holes.

The forcible insertion of the parts of the jacket into a sleeve avoids brazing and facilitates the manufacture and control of the slide-valve. Since the need for brazing or welding is eliminated, standard hard steels may be employed for the manufacture of the parts, and the sleeve may also be of ordinary quality steel thus making it easier to machine the exterior of the sleeve.

A distributor of this type is illustrated with reference to the figures of the accompanying drawings, the following description of this distributor and its method of construction being given merely by way of example and not in any sense by way of implied limitation.

In the drawing:

FIG. 1 is a view in axial cross-section of the sleeve employed in accordance with the invention.

FIGS. 2 and 3 respectively show an end view and an axial cross-section of one of the end elements of the jacket.

FIGS. 4, 5, and 6 show the central member of the jacket seen respectively in longitudinal cross-section and from the end of each side.

FIG. 7 shows an axial cross-section of one of the intermediate parts of the jacket.

FIG. 8 shows an axial cross-section of an assembly for grinding the different parts of the jacket at the same time.

FIG. 9 is an axial cross-sectional view of the above device inserted in the sleeve through a plane perpendicular to the plane of FIG. 8.

FIG. 10 shows an axial cross-section of the assembly of jacket and sleeve ready for the straightening of the extremities.

Figure 13:
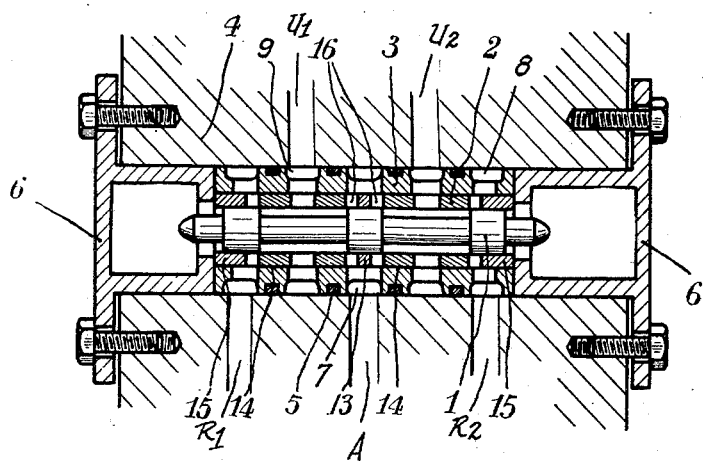
FIG. 13 shows an assembly of the slide-valve which avoids any possibility of deviation of the parts of the jacket under the effect of the pressure of the liquid.

In the assembly shown in FIG. 13 there may be seen at 1 the slide-valve of a distributor for a hydraulic servo-motor intended, for example, to actuate a double-acting hydraulic jack; 2 is the jacket of the distributor, 3 the sleeve and 4 a distributor body bored to the external diameter of the sleeve; sealing joints 5 isolate the different individual openings of the sleeve from each other and consequently from the jacket. Fluid under pressure arrives through the conduit A and is delivered, depending on whether the slide-valve 1 is pushed to the right or to the left, into the utilization conduit $U_1$ or into the utilization conduit $U_2$. $R_1$ and $R_2$ are outlet conduits. In the first case, $R_2$ communicates with $U_2$ and in the second case, $R_1$ communicates with $U_1$.

Two members 6 forcibly applied against the extremities of the sleeve and of the jacket prevent any relative movement of the parts under the effect of the hydraulic pressure, while still permitting free movement of the slide-valve.

The construction of a distributor in accordance with the invention is carried out as follows:

(1) A sleeve 3 (FIG. 1) is prepared and the bore of this sleeve is machined with moderate precision to the external diameter of the jacket 2. Its external diameter is turned also with moderate precision to the internal diameter of the body 4 of the distributor in which it is designed to be housed. It is provided with circular grooves 7, 8, 9 and the corresponding bores 10, 11, 12 which enable the ports of the jacket to be put into communication.

(2) The jacket 2 which may also be seen in FIG. 8 comprises a central part 13, two identical intermediate parts 14 and two end parts 15 which are also identical. These parts are shown individually and respectively in FIGS. 4, 5 and 6, 7, and 2 and 3. In FIGS. 4 and 7 the gauges 13a and 14b are also shown. The members 13 and the gauge 13a are ground together to the dimension $a$, the members 14 and the gauge 14b are ground together to the dimension $b$ (by proceeding in batches for mass production). The parts 15 do not need to be ground since their length is not subjected to a strict tolerance requirement. On the two end faces of the part 13 there are formed two slots 16 which are diametrically opposed and of rectangular section and, in one end face of each part 15, two slots 17 are formed which are diametrically opposed and have a rectangular section. These slots are produced without difficulty by milling. Diametrically opposite apertures 21 are also bored in the elements 14.

(3) The parts 13, 14, 15, arranged as shown in FIG. 8, are fixed on a centering rod 18 and clamped by a nut 19. The external diameter is ground as a function of the bore of the sleeve in such manner as to grip the jacket 2 in the sleeve 3.

(4) The jacket 2, which is held by the bolt 18 and the nut 19 in the sleeve 3 as shown in FIG. 9, is inserted into the sleeve on by heating the sleeve 1 and by cooling the jacket.

(5) The machining of the exterior of the sleeve is finished off by forming the grooves 20 (FIG. 10) for fluid-tight fittings and after removing the bolt 18, the ends of the jacket, thus obtained, bound together by the sleeve 3, are then straightened. The assembly then has the form as shown in FIG. 10.

(6) The slide-valve is in turn ground to the dimensions $a$ and $b$ with the assistance of the gauges 13a and 14b.

Figure 11:
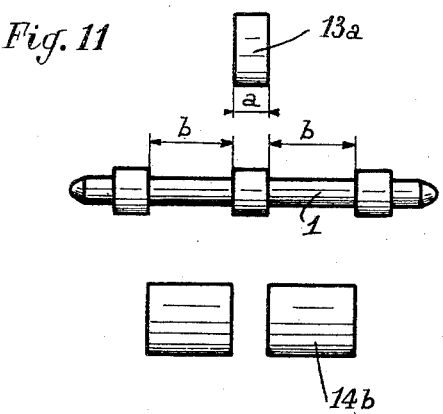
FIG. 11 shows the slide-valve with the corresponding gauges shown opposite the parts having strict dimensions.
Figure 12:
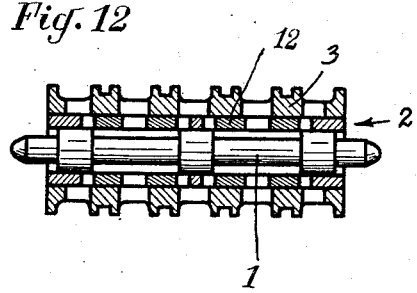
FIG. 12 shows an axial cross-section of the assembly of jacket, sleeve and slide-valve assembled for the running-in of the slide-valve in its jacket.

(7) The usual operation of running-in the slide-valve 1 in its jacket 2 (FIG. 12) is then carried out.

(8) And the assembly shown in FIG. 13 is then completed.

What I claim is:

1. A fluid distributor of the slide-valve type for servo-control comprising a distributor body having a cylindrical cavity into which open cross-passages for the circulation of the fluid, a sleeve fitted and rigidly fixed in said cavity, said sleeve being provided with circular grooves corresponding to said passages, and transverse bores extending in said grooves; a tubular jacket constituted by individual annular members in end to end relation encircled by said sleeve in interfering relation such that said sleeve and annular members constitute a rigid assembly which is adapted for being fabricated according to mass production techniques, at least one transverse slot of substantially rectangular section being provided on one face of one of the said annular members in contact so as to form, with the opposite face of the other member, a conduit of rectangular section passing through the wall of said member, each transverse conduit having its opening opposite one of said transverse bores; and a slide-valve, movable in said tubular jacket, and including pistons fitted in said jacket and rods of smaller diameter connecting the pistons, the lengths of the pistons and the spaces which separate said pistons correlating to the lengths of said members.

2. A distributor in accordance with claim 1 comprising abutments and in which the sleeve and the jacket are immovably supported in the body of the distributor by said abutments in contact with their end faces said abutments being fixed to the body of the distributor.

3. A fluid distributor of the slide-valve type for servo-control comprising a distributor body having a cylindrical cavity into which opens a passage for the admission of fluid under pressure between two distribution passages and two return passages; a sleeve rigidly fixed in said cavity in immovable relation relative to said body and provided with circular grooves positioned in correspondence with said passages and transverse bores in said grooves to provide communication interiorly of said sleeve; a tubular jacket including five tubular members disposed in end-to-end relation and in interfering relation with said sleeve, such that the tubular jacket and said sleeve constitute a rigid assembly, said assembly being adapted for mass production manufacture, said tubular members being constituted by one central member and four members symmetrically disposed two by two, on each side of the central member, said central member having two faces, the remaining members being end and intermediate members, the end members having respective faces in contact with said intermediate members, there being provided a transverse slot of substantially rectangular section in each of the faces of the central member and in the faces of the end members in contact with the intermediate members so as to form, with the face in contact with said intermediate member, a conduit of rectangular section effectively passing through the latter said member, each said conduit opening opposite one of said transverse bores, and a slide-valve in said tubular jacket and including three coaxial pistons in said jacket and two rods connecting the pistons two by two, the length of the central piston being equal to that of the central tubular member and said pistons being spaced at a distance equal to the length of an intermediate member.

References Cited in the file of this patent
UNITED STATES PATENTS

| | | |
|---|---|---|
| 1,704,759 | Miller | Mar. 12, 1929 |
| 2,016,878 | Vickers | Oct. 8, 1935 |
| 2,705,829 | Mock | Apr. 12, 1955 |
| 2,796,081 | Dannevig et al. | June 18, 1957 |
| 2,902,053 | Seddon | Sept. 1, 1959 |
| 2,905,150 | Ebert | Sept. 22, 1959 |
| 2,908,292 | Beckett | Oct. 13, 1959 |
| 2,920,650 | Moog | Jan. 12, 1960 |
| 2,987,050 | Oppenheimer | June 6, 1961 |